United States Patent [19]
Thomey et al.

[11] Patent Number: 5,370,585
[45] Date of Patent: Dec. 6, 1994

[54] ECCENTRIC TYPE BELT TENSIONER WITH CAM OPERATED DAMPING MEANS

[75] Inventors: Henry W. Thomey, St. Clair Beach; Andrezj Dec, Windsor, both of Canada

[73] Assignee: The Gates Rubber Company, Denver, Colo.

[21] Appl. No.: 10,218

[22] Filed: Jan. 27, 1993

[51] Int. Cl.⁵ .............................. F16H 7/10
[52] U.S. Cl. ..................... 474/112; 474/135
[58] Field of Search ............. 474/117, 112, 101, 135

[56] References Cited

U.S. PATENT DOCUMENTS

| | | | |
|---|---|---|---|
| 4,551,120 | 11/1985 | Thomey | 474/135 |
| 4,557,707 | 12/1985 | Thomey | 474/101 |
| 4,557,709 | 12/1985 | St. John | 474/135 X |
| 4,721,495 | 1/1988 | Kan et al. | 474/135 |
| 4,808,148 | 2/1989 | Holtz | 474/112 |
| 4,834,694 | 5/1989 | Martin | 474/135 |
| 4,917,655 | 4/1990 | Martin | 474/112 |
| 4,934,987 | 6/1990 | Kadota et al. | 474/135 X |
| 5,256,112 | 10/1993 | Thomey et al. | 474/135 |
| 5,266,067 | 11/1993 | Gapco | 474/135 X |

Primary Examiner—Roger J. Schoeppel
Attorney, Agent, or Firm—H. W. Oberg; C. H. Castleman; S. G. Austin

[57] ABSTRACT

A spring bias tensioner of the eccentric type with a fixed cam ring and rotatable cam ring activated by a torsion spring wherein the cam rings generate an axially force to engage radial friction sliding surfaces to affect damping as a pivot arm of the tensioner is moved.

9 Claims, 1 Drawing Sheet

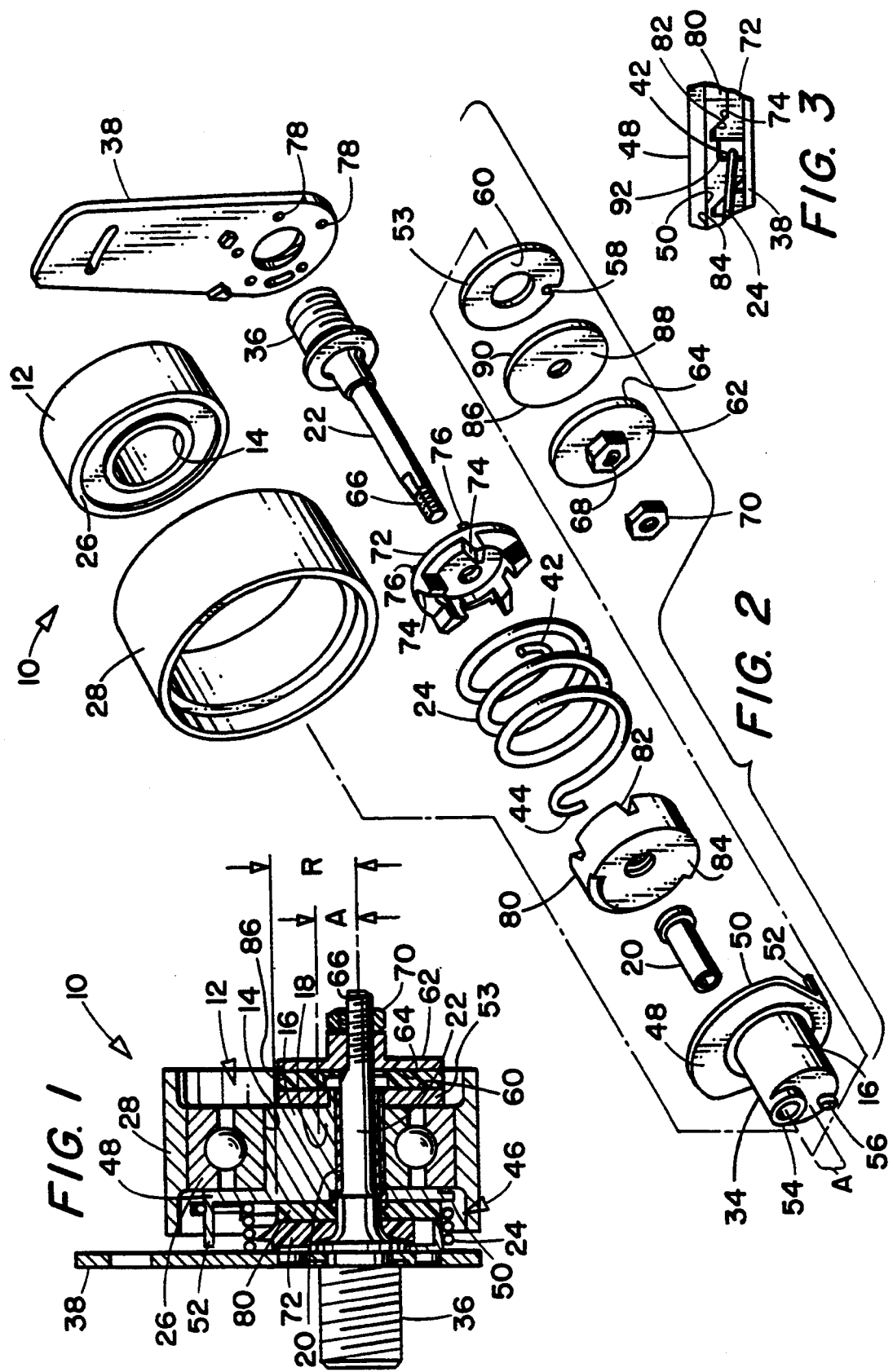

ECCENTRIC TYPE BELT TENSIONER WITH CAM OPERATED DAMPING MEANS

BACKGROUND OF THE INVENTION

The invention relates to a spring biased tensioner of the eccentric type with an effective pivot arm as part of a stub shaft and located within the inside diameter of a pulley bearing, but more particularly, the invention relates to an eccentric type tensioner with a damping mechanism utilizing friction surface sliding for inhibiting pivotal oscillations of the pivot arm.

Various mechanisms are used to inhibit angular movements of a tensioner's pivot arm about its pivot axis. An example of a non-eccentric type tensioner (i.e., where the pivot arm has a length that is greater than the radius of a pulley carried by the pivot arm) utilizing a cam activated damping mechanism is disclosed in U.S. Pat. No. 4,557,707. Besides its overall large size comparative to an eccentric type tensioner, the cam operated mechanism of the '707 tensioner operates at an effective radius that is less than the length of the tensioner's pivot arm which affects an insensitivity of the damping torque relative to the output torque of the tensioner as reacted through the pivot arm by way of a pulley.

Another problem associated with the size of the non-eccentric belt tensioner of the type disclosed in U.S. Pat. No. 4,557,707, is that the cam operated damping mechanism is located outside a radial boundary of the pulley.

Still another problem associated with the '707 tensioning device is that the cam mechanism includes a singular, polymeric cam ring in which cam followers in the form of bent tabs are located. With a single, plastic cam follower ring, it is difficult to change operating characteristics of the friction sliding surfaces, the slope of the surfaces, as the cam is in the form of bent tabs of metal.

An example of an eccentric type tensioner that includes a cam activated mechanism, is disclosed in U.S. Pat. No. 4,834,694. The cam activated mechanism of the tensioner does not operate to provide a variable axial force associated with damping pivotal movements of the pivot arm, but rather, the cam mechanism operates as a one-way clutch where a radial force is generated to move a follower to lockup with an inner surface of a pulley supporting housing whereby movements of the pivot arm in a non-tensioning direction, are prevented or substantially inhibited.

Another example of an eccentric type tensioner is disclosed in U.S. Pat. No. 4,808,148. While a cam operated mechanism is not used, a locking mechanism in the form of a ratchet and pawl, is used to prevent the pivot arm from rotating in a non-tensioning direction which is similar to the operation of the aforementioned '694 tensioner. However, the '148 device presents a size problem in that the rachet and pawl mechanism is located within the inside diameter of a pulley bearing making the bearing overly large and expensive in comparison to other eccentric type tensioning devices that are without additional mechanisms located within a bearing bore.

Still another problem associated with the aforementioned tensioners is that the location of friction sliding surfaces are at an effective radius that is equal to less than the length of the pivot arm, or the inside radius of its pulley bearing.

The present invention primarily concerns belt tensioners of the eccentric category and makes possible the use of small pulley bearings.

SUMMARY OF THE INVENTION

In accordance with the invention, an eccentric type tensioner is provided with the centers for a pulley bearing and a pivot positioned within the inside diameter of the pulley bearing. A pivot arm is formed as a portion of a stub shaft to which the pulley bearing is attached. A pivot-pin extends through the stub shaft such that the pivot-pin is radially eccentric to the pulley bearing axis. The eccentric radius defines a pivot arm length for the tensioner. A spring means biases rotation of the pivot arm about the pivot-pin.

A feature of the invention is a damping mechanism which includes a fixed cam ring coaxially positioned in relation to the pivot pin and having a plurality of axially facing, circumjacent tapered cam surfaces. A rotatable cam ring has a plurality of oppositely facing tapered cam surfaces that substantially compliment and engage the cam surfaces of the fixed cam ring. First and second disc-like members are operatively connected at oppositely facing ends of the stub shaft and sides of a pulley bearing which each define a surface for friction surface sliding against a friction material positioned at an effective radius from the pivot pin. Angular movement of the pivot arm operates to activate the cam surfaces which separates the cam rings so as to vary an axial force applied to the friction sliding surfaces. In one embodiment of the invention, the friction sliding surfaces operate at an effective radius from the pivot pin axis where such radius is greater than the pivot arm length.

These and other features of the invention will be apparent after reviewing the drawings and description thereof wherein:

FIG. 1 is a partial, axial cross-sectional view a tensioner of the invention;

FIG. 2 is an exploded and oppositely facing, isometric view of the tensioner of FIG. 1; and FIG. 3 is an enlarged, partial view taken radially inwardly, showing the interaction of two cam rings activated by a torsional spring.

DETAILED DESCRIPTION OF PREFERRED EMBODIMENTS

Referring to the Figures, a belt tensioner 10 of the invention is provided with: a bearing 12 having a bore 14 at an inside diameter; a stub shaft 16; a pivot arm 18 formed as a portion of the stub shaft 16; a pivot bushing 20; a pivot pin 22; and a spring 24. For some applications, the outer race 26 of the bearing 12 may be used directly as a pulley member. However, and as illustrated in FIGS. 1 and 2, a pulley 28 is attached to the outer race.

The bearing is positioned with its inside bore 14 substantially at the circumference 34 of the stub shaft 16. The bearing may be attached by any desired means to the stub shaft such as by an interference fit between the bore of the bearing and the outside circumference 34 of the stub shaft.

The pivot bushing 20 and pivot-pin 22 extend through and are eccentric to the stub shaft at a radius defining a pivot arm length A. Pivot-pin 22 has a mounting means 36 for an attachment to a nonrotatable member such as some part of an engine, not shown. The mounting means 36 may also extend through and attached to a nonrotating base member 38.

The spring is preferably of the torsional type, and preferably, has bent ends 42, 44 as means for operatively interconnecting the spring so as to bias rotation of the pivot arm about the pivot-pin causing eccentric movements of the bearing and pulley. The spring is interconnected to a cam operated damping means 46 to inhibit rotation of the pivot arm about the pivot pin.

Referring more particularly to FIG. 2, a first disc-like member 48 with a radially oriented friction sliding surface 50 and a tang 52 is affixed to the stub shaft 34 such as by being an integral component part thereof. A second disc-like member 53 is affixed at the opposite end of the stub shaft 50 such as by means of a collar 54, a pin 56, and slot 58. The second disc-like member 53 has a radially oriented friction sliding surface 60, and both the first and second disc-like members rotate with the stub shaft. A third disc-like member 62 with a radially oriented friction sliding surface 64 may optionally be included and fixed against rotation with the pivot-pin by means of a flat 66 formed as part of the pivot-pin, and flat 68 formed as part of a wrenching surface of the third disc-like member. A fastener 70 holds the assembly together.

A fixed cam ring 72 is positioned substantially coaxially with the pivot pin and has a plurality of circumjacent and tapered cam surfaces 74 oriented in the same circular direction. The affixed cam ring is prevented from rotating by means of positioning pins 76 formed as part of the cam ring, meshed with apertures 78 formed in the base member 38.

A rotatable cam ring 80 is positioned substantially coaxially with the fixed cam ring and has a plurality of oppositely facing, circumjacent and tapered cam surfaces 82.

The fixed cam ring and rotatable cam ring are preferably made of plastic materials, and optionally may be made of different plastic materials so as to characterize a coefficient of friction of the engaged cam surfaces where the friction is in a range that is greater than zero and less than about 0.15. Any suitable plastic material may be used. Examples of such materials are nylon such as manufactured by LNP Engineering Plastics Inc. and sold under the brand Lubricimp 189; and acetol such as manufactured by DuPont and sold under the brand 500 TL. The cam rings may be made of the same or different plastic materials.

Rotatable cam ring 80 defines a radially oriented friction sliding surface 84 that engages the friction sliding surface 50 of the first disc member. A disc like washer 86 of a suitable plastic material such as those exemplified for the fixed and rotatable cam rings, has oppositely axially facing friction sliding surfaces 88, 90 which engage flat friction sliding surfaces 64, 60.

The spring 24 is operatively connected with end 44 hooked around tang 52, and the opposite end 42, hooked around and positioned in a slot 92 of the rotatable cam ring.

Rotation of the pivot arm winds the spring whereby end 42 of the spring pulls against the rotatable cam ring causing the rotation thereof. The cam rings, with the engaged tapered surfaces move to axially separate the rings from each other as the spring is wound. The friction sliding surfaces including the engaged tapered surfaces are pulled into operative engagement by the axial force which varies in accordance with a force as induced by the torsional spring. As best shown in FIG. 1, the friction sliding surfaces of the cam rings and radial surfaces juxtaposed thereto, are at an effective radius R that is greater than the pivot-arm length. The greater arm length assures a greater percentage of achievable damping and is present in prior art devices.

The foregoing description is made for purpose of illustration only and the scope of the invention is to be determined from the appended claims.

What is claimed is:

1. In a tensioner with a pulley bearing positioned on a stub shaft, a pivot arm formed as a portion of the stub shaft, a pivot pin having a portion extending with a pivot bushing through and eccentric to the stub shaft at a radius defining a pivot-arm length, a torsion spring for biasing directional rotation of the pivot arm about the pivot pin, and a damping mechanism for inhibiting rotation of the pivot arm about the pivot pin, wherein the improvement comprises:

a fixed cam ring substantially coaxially positioned with the pivot pin and having a plurality of circumjacent and tapered cam surfaces oriented in the same circular direction;

a rotatable cam ring substantially coaxially positioned with the fixed cam ring and having a plurality of oppositely facing, circumjacent and tapered cam surfaces that substantially compliment and engage the cam surfaces of the fixed cam ring;

the torsional spring positioned with coils generally circumferentially around the pivot pin and having one end portion operatively connected to the rotatable cam ring and a second end portion operatively connected to the pivot arm;

first and second disc-like members operatively connected at oppositely facing ends of the stub shaft and sides of the pulley bearing, each disc-like member defining a radial surface for friction surface sliding against a friction material at an effective radius from the pivot pin; and wherein angular movement of the pivot arm in a direction that winds the torsional spring, operates to angularly move the rotatable cam ring and its engaged cam surfaces relative to the fixed cam ring so as to axially separate the rings and increase an axial force applied to the friction sliding surfaces.

2. The tensioner as claimed in claim 1 wherein the effective radius for friction surface sliding is greater than the pivot-arm length.

3. The tensioner as claimed in claim 1 wherein the rotatable cam ring has an oppositely axially facing surface from its cam surfaces, that defines a friction material surface for friction surface sliding against one of the disc-like members.

4. The tensioner as claimed in claim 3 wherein the fixed cam ring and the rotatable cam ring are of different plastic materials and are characterized by the engaged cam surfaces as having a resulting coefficient of friction from a range that is greater than 0 and less than about 0.15.

5. The tensioner as claimed in claim 4 wherein plastic materials are selected from the group consisting of nylon and acetol.

6. The tensioner as claimed in claim 1 and further comprising a flanged fastener attached to a cantilevered end of the pivot pin, the flanged portion of the fastener defining a third radial surface for friction surface sliding against a juxtaposed friction material.

7. In a tensioner with a pulley bearing positioned on a stub shaft, a pivot arm formed as a portion of the stub shaft, a pivot pin having a portion extending with a pivot bushing through and eccentric to the stub shaft at a radius defining a pivot-arm length, a torsion spring for biasing directional rotation of the pivot arm about the pivot pin, and a damping mechanism for inhibiting rotation of the pivot arm about the pivot pin, wherein improvement in the damping mechanism comprises:

cam means operative in conjunction with the torsion spring for generating a variable forces oriented substantially with the pivot pin axis;

friction sliding surface means operative in conjunction with the variable force and defining means for generating a damping force operative at an effective radius from the pivot pin axis; and wherein the effective radius is greater than the pivot-arm length.

8. The tensioner as claimed in claim 7 wherein the cam means comprises:

a fixed cam ring substantially coaxially positioned with the pivot pin and having a plurality of circumjacent and tapered cam surfaces oriented in the same circular direction;

a rotatable cam ring substantially coaxially positioned with the fixed cam ring and having a plurality of oppositely facing, circumjacent and tapered cam surfaces that substantially compliment and engage the cam surfaces of the fixed cam ring;

the torsional spring is positioned with coils generally circumferentially around the pivot pin and having one end portion operatively connected to the rotatable cam ring and a second end portion operatively connected to the pivot arm; and wherein angular movement of the pivot arm in a direction that winds the torsional spring, operated to angularly move the rotatable cam ring and its engaged cam surfaces relative to the fixed cam ring so as to axially separate the rings and increase an axial force applied to the friction sliding surfaces.

9. The tensioner as claimed in claim 8 wherein the means for generating a damping force comprises:

first and second disc-like members operatively connected at oppositely facing ends of the stub shaft and sides of the pulley bearing each defining a radial surface for friction surface sliding against a friction material of the friction sliding surface means at an effective radius from the pivot pin.

* * * * *